April 4, 1961 B. M. SOSIN 2,978,579

SIGNAL MIXERS

Filed Dec. 10, 1959

INVENTOR

Boleslaw Marian Sosin

BY

Baldwin & Wright

ATTORNEYS

United States Patent Office 2,978,579

Patented Apr. 4, 1961

2,978,579

SIGNAL MIXERS

Boleslaw Marian Sosin, Great Baddow, England, assignor to Marconi's Wireless Telegraph Company Limited, London, England, a company of Great Britain Filed Dec. 10, 1959, Ser. No. 858,780

Claims priority, application Great Britain May 25, 1959

6 Claims. (Cl. 250—20)

Figure 1:
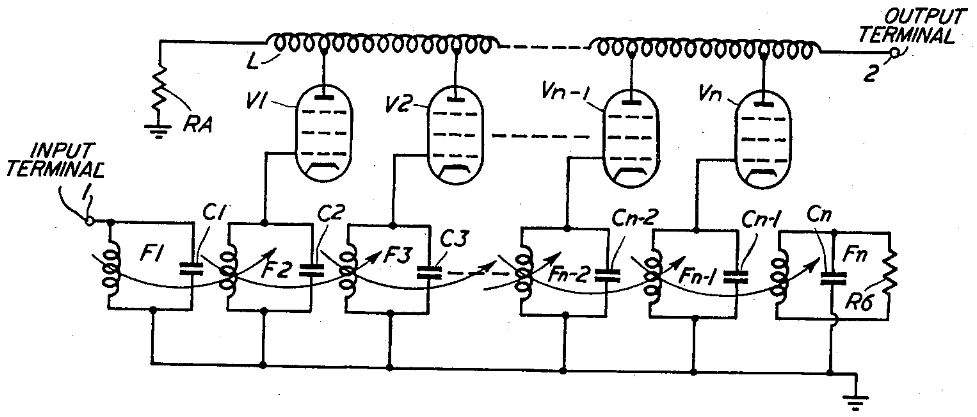

This invention relates to signal mixers i.e. devices for deriving from signals of two input frequencies output signals of a frequency equal to the elgebraic sum (by which is meant the sum or difference) of the input frequencies.

A difficulty met with in connection with signal mixers, as at present known, is that if the power is such that a single valve or crystal diode is insufficient so that a number of valves or crystal diodes has to be used, such use increases the input and output capacities of the mixer and accordingly undesirably limits the frequency band over which the mixer is satisfactorily operable.

It is the main object of the present invention to provide improved signal mixers which are capable of operation over a wide frequency band at considerably higher powers than comparable known signal mixers.

The present invention incorporates, in a similar manner to so-called "distributed" amplifiers, input and output filter lines which are constituted in part by valve capacities.

According to this invention a wide-band signal mixer for deriving output sum or difference frequency signals from signals of two input frequencies comprises a plurality of valve devices; at least one input filter line and an output filter line, the shunt arms of both said filter lines being constituted at least in part by electrode capacities of said valve devices which have input electrodes connected to different points along the input filter line and output electrodes connected to different points along the output filter line, said last mentioned points being so chosen that the phase delay at the sum or difference output frequency (as the case may be) between successive output electrodes along said output filter line is substantially equal to the sum, or difference, respectively, of the phase delays at the two input frequencies between the input electrodes of corresponding valve devices; means for applying input signals to said input filter line; and means for taking output from said output filter line.

The term "valve devices" is used in this specification in a broad sense to include not only valves properly so called, i.e. thermionic valves, but also devices of the like function and operability. The term therefore includes transistors.

Preferably the output filter line is so designed that it will not pass the input frequencies. Preferably also the pass band of the output filter line is such as to exclude unwanted sideband frequencies.

There may be two input filter lines each fed with a different one of the two input frequencies and each valve device may have two input electrodes, one electrode being connected to one input filter line and the other to other. This arrangement is, however, not preferred due to its increased bulk and cost. In a preferred arrangement each valve device has one input electrode and a single input filter line is fed with signals at the two input frequencies.

A push-pull signal mixer arrangement in accordance with this invention comprises two substantially identical signal mixers as above described; means for applying one input signal in push-pull and the other in parallel to the input terminals of said mixers, and means for taking output signals in push-pull from the output terminals of said mixers.

Figure 2:
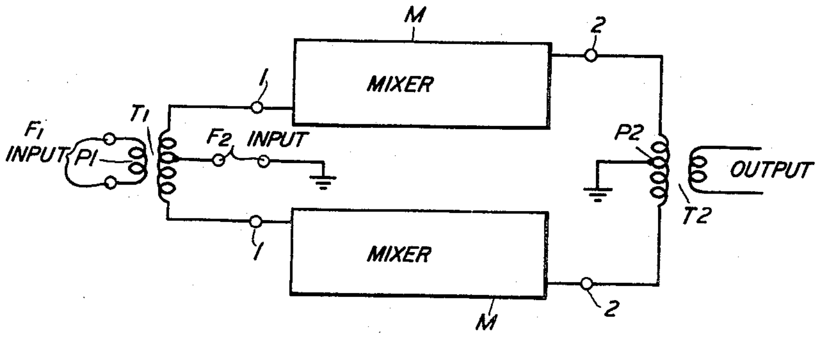

The invention is illustrated in the accompanying drawings in which Fig. 1 and Fig. 2 show diagrammatically two embodiments of the invention.

Referring to Fig. 1 input signals of the two frequencies to be mixed are fed via a matching network (not shown) and terminal 1 to an input filter line comprising sections $F_1$, $F_2$, $F_3$ . . . $F_{n-2}$, $F_{n-1}$ and $F_n$. The inductive arms of each of these filter sections comprise similar inductances which are all mutually coupled, as is indicated by the linking arrows.

The capacitive arms of the filter sections $F_1$ and $F_n$ comprise condensers $C_1$ and $C_n$ respectively, while the capacitive arms of filter sections $F_2$, $F_3$ . . . $F_{n-2}$ and $F_{n-1}$ are constituted by condensers $C_2$, $C_3$ . . . $C_{n-2}$ and $C_{n-1}$ respectively together with the input and stray capacities of the valves $V_1$, $V_2$ . . . $V_{n-1}$ and $V_n$ respectively, to whose control grids the appropriate filter sections are connected. The input filter line is terminated by the matching resistance $R_g$.

The input filter line is chosen to have a suitable characteristic impedance and a pass band which includes all the input frequencies of the range over which the mixer is desired to operate. In addition the individual filter sections are so chosen that the difference in the phase delays between successive valve control grids along the line varies substantially linearly with frequency over the frequency range in which operation is required. The design of such a filter line is a well-known technique and further description here is unnecessary.

The anodes of the valves are connected to different points along an anode or output filter line which is constituted by a single winding L and by the anode and stray capacities of valves $V_1$, $V_2$ . . . $V_{n-1}$ and $V_n$. This anode filter line is terminated at one end by a matching resistance $R_A$ and at the other end by a matching network (not shown) and load (also not shown) connected to the output terminal 2. The anode filter line constitutes a low pass filter whose pass-band is such as to pass the difference in the input frequencies over the range for which the mixer is required to operate, but to stop the individual input frequencies. The anode filter line characteristic impedance is chosen in dependence on the individual valve characteristics and the anodes of the valves are connected to the anode filter line at such points that the phase delay over the required range of output frequencies between successive valve anodes is substantially equal to the difference in the phase delays at the appropriate input frequencies between the control grids of the corresponding valves. In addition the variation in phase delay along the anode filter line with frequency over the required operating range is arranged to be substantially linear, this being achieved, in well-known manner, by the mutual inductive coupling between adjacent parts of the winding L. Here again no further description of the design of the anode filter chain is required, such design techniques being well-known.

It will be seen that with a mixer as above described the anode currents, at the difference frequency of the two input signals, of the valves $V_1$, $V_2$ . . . $V_{n-1}$ and $V_n$ will add substantially in phase towards the load.

In the above description the input signals of both input frequencies were applied to one end of the input filter line. This is not a necessity, however, and the two frequencies may be fed into opposite ends provided that the filter line is suitably designed to maintain the necessary phase relationship at the valve control grids.

Figure 2 shows an embodiment of the invention comprising a push-pull mixer. Referring to the figure, the blocks M represent mixers each as described with reference to and illustrated in Figure 1. Input signals of one frequency are fed via a matching network (not shown) to the terminals of the primary winding $P_1$ of a transformer $T_1$ and input signals of a second frequency are fed via a matching network (not shown) between the centre tap of the secondary winding of transformer $T_1$ and earth. The ends of the secondary winding of transformer $T_1$ are connected to the input terminals 1 of the mixers M whose output terminals 2 are connected to ends of the primary winding $P_2$ of output transformer $T_2$. The centre tap in this winding is earthed and the secondary winding of transformer $T_2$ feeds output signals, at a frequency of the difference between the two input frequencies, to a matching network and load (not shown).

Such a push-pull arrangement has the advantage that even harmonics of the output frequency and some even order harmonics products of the input frequencies are eliminated in the output.

I claim:

1. A wide-band signal mixer for deriving output sum or difference frequency signals from signals of two input frequencies comprising a plurality of valve devices; at least one input filter line and an output filter line, the shunt arms of both said filter lines being constituted at least in part by electrode capacities of said valve devices which have input electrodes connected to different points along the input filter line and output electrodes connected to different points along the output filter line, said last mentioned points being so chosen that the phase delay at the sum or difference output frequency (as the case may be) between successive output electrodes along said output filter line is substantially equal to the sum, or difference, respectively, of the phase delays at the two input frequencies between the input electrodes of corresponding valve devices; means for applying input signals to said input filter line; and means for taking output from said output filter line.

2. A mixer as claimed in claim 1 wherein the output filter line is so dimensioned that it will not pass the input frequencies.

3. A mixer as claimed in claim 1 wherein the output filter line is so dimensioned that its pass band excludes unwanted side band frequencies.

4. A mixer as claimed in claim 1 wherein there are two input filter lines each fed with a different one of the two input frequencies and each valve device has two input electrodes, one electrode being connected to one input filter line and the other to the other.

5. A mixer as claimed in claim 4 wherein each valve device has one input electrode and a single input filter line is fed with signals at the two input frequencies.

6. A push-pull mixer arrangement comprising two substantially identical signal mixers as claimed in claim 1; means for applying one input signal in push-pull and the other in parallel to the input terminals of said mixers, and means for taking output signals in push-pull from the output terminals of said mixers.

References Cited in the file of this patent

UNITED STATES PATENTS 2,801,295 Sabaroff ---------------- July 30, 1957